Oct. 6, 1970  J. D. STRONG ETAL  3,531,991
MEAN RADIATION TEMPERATURE METER
Filed July 28, 1967  5 Sheets-Sheet 1
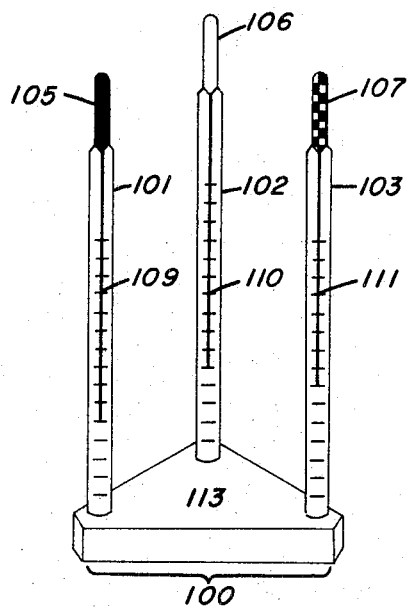
FIG. 1
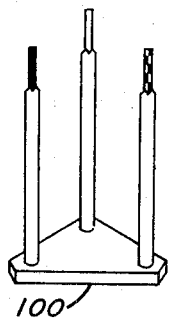
FIG. 2
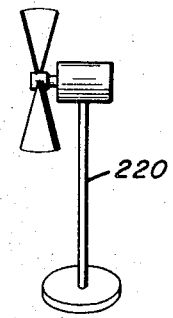
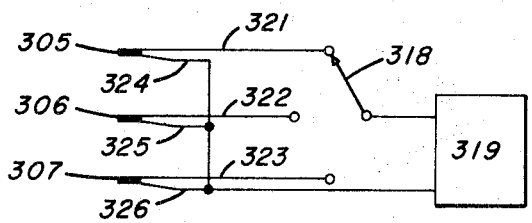
FIG. 4
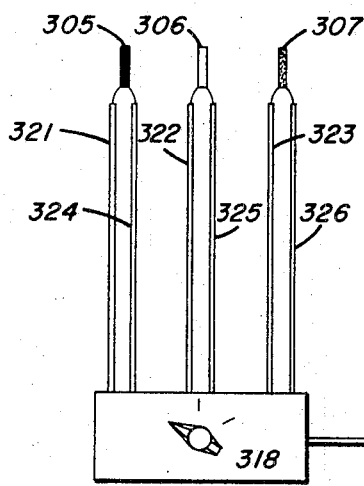
FIG. 3
John Strong
John F. McClellan
INVENTORS Oct. 6, 1970  J. D. STRONG ETAL  3,531,991
MEAN RADIATION TEMPERATURE METER Filed July 28, 1967  5 Sheets-Sheet 2

John Strong
John F. McClellan
INVENTORS

Oct. 6, 1970   J. D. STRONG ETAL   3,531,991
MEAN RADIATION TEMPERATURE METER
Filed July 28, 1967   5 Sheets-Sheet 3

John Strong
John F. McClellan
INVENTORS

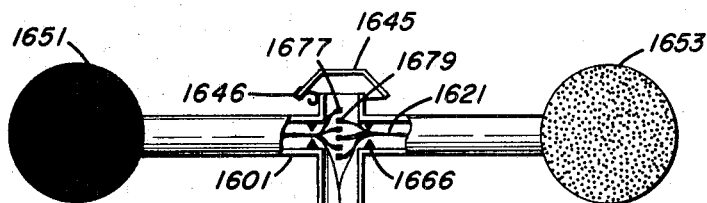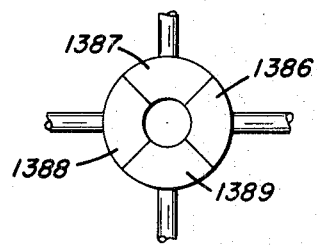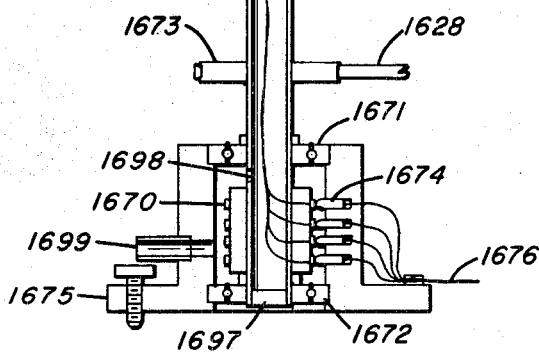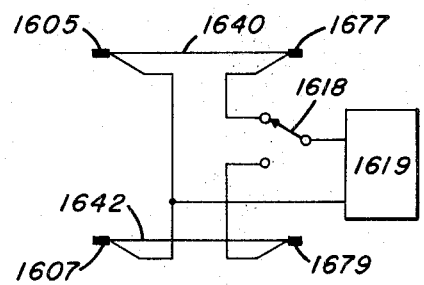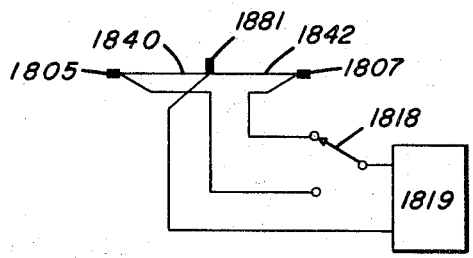

Oct. 6, 1970

J. D. STRONG ETAL 3,531,991

MEAN RADIATION TEMPERATURE METER

Filed July 28, 1967

John Strong
John F. McClellan
INVENTORS

3,531,991
Patented Oct. 6, 1970

3,531,991
MEAN RADIATION TEMPERATURE METER
John D. Strong, 5 Chadwick Court, Amherst, Mass.
01002, and John F. McClellan, Stansbury Mill Road,
Monkton, Md. 21111
Filed July 28, 1967, Ser. No. 660,866
Int. Cl. G01k *3/02*
U.S. Cl. 73—355                                    25 Claims

ABSTRACT OF THE DISCLOSURE

A meter to determine environmental mean radiation temperature relative to air temperature. Polished, gray, and black temperature sensors yield two temperature differences which are combined according to equation to give the desired radiation temperature independent of air conduction and convection heat losses by the sensors.

---

This invention relates generally to temperature measurement, and specifically to means and method for determining the mean-radiation-temperature increment, defined for purposes of this disclosure as, at the location of the measuring instrument, the difference between the mean radiation temperature of the surround, and the air temperature.

Conduction and convection are often less important than radiation for bringing the temperature of an exposed body to equilibrium with respect to its surround. Because the air is remarkably transparent to temperature radiation, an exposed body coming into equilibrium exchanges energy radiatively with the solid and fluid bodies which can be seen from the position of exposure. A body exposed out of doors will receive energy through the air from such heat sources as the sun and will lose radiation through the air to such heat sinks as the sky. Thus, if all exchange were by radiation the final temperature of a thermometer would be equal to some sort of mean of the radiation temperature of all the objects which occupy the solid angle surrounding it. This temperature is called the mean-radiation-temperature. As set forth in Dr. Middleton's History of the Thermometer, considerable attention has been given by meterologists and physicists to the manner of exposure of thermometers which will make them immune to the radiation temperature and responsive to the temperature of the air. The principle followed by this effort when it is successful is first to insure that every surface then can be "seen" radiatively by the thermometer is at or near the air temperature and second to provide for ventilation to increase the exchange of heat by conduction and convection between the thermometer and the air around it.

In the present invention, the objective is measurement of the mean radiation temperature in an exposed location rather than measurement of air temperature in a sheltered location.

Joseph Fourier gave a detailed exposition in 1817 of the effect of the radiation from surroundings on the thermometer. He showed how the thermometer could be either warmed or cooled by environmental radiation and considered the question of how to measure the true temperature of the air. His solution was to have two similar thermometers, the bulb of one black and the bulb of the other coated with polished metal: "in general the temperature of the air is equal to that of the metalized thermometer plus the difference of the temperatures of the two thermometers divided by a constant number." It was only several decades later that it was realized that things are not quite this simple. This question of determining the true air temperature is complicated by the variation of the heat loss by the thermometer to the air due to variable ventilation of the thermometer with air movement. This invention wherein we attempt to measure the mean radiation temperature meets this and other difficulties in the manner treated below.

The partition of heat loss (or gain) between radiation and air conduction and convection for an exposed object is of interest to meteorologists, to ventilation engineers, and to physiologists. For example, radiation is an important parameter of climate—on a clear night radiation to the cold sky can produce frost. Ventilation engineers, to provide for human comfort indoors, seek to control air-temperature, humidity, and the mean radiation temperature. And physiologists are interested in the balance between these factors because the partition between radiation and air conduction and convection determines the character of comfort. For example: exposure to cold air, compensated by radiant heating, is pleasant and invigorating, whereas the inverse, exposure to a surround of cold walls with compensating warm air, feels dank.

An embodiment of this invention, briefly described, comprises three identical arrays of electrically responsive thermal sensors housed respectively in three similar metal radiation-receivers differing only in wall thickness and in having surfaces treated so that the receivers have similar surface shapes and thermal relaxation time constants, but discrete emission-absorption characteristics; a frame for holding the receivers in spaced relation and for rotating them as a unit, to provide uniform and equal exposure of all to the mean radiation temperature and air temperature of the surrounding environment; and electrical connection of the sensor arrays, through sliprings and a switch box, to an amplifier-display unit for comparison of their electrical responses, as required by the method supplied, all used in such manner, as set forth hereunder, to derive the environmental mean radiation temperature.

Methods of interpreting sensor response for the various embodiments and explanation of the theoretical basis for the instrument follow the description of the figures, in which:

FIGS. 1 and 2 are perspective views of embodiments of the invention;

FIG. 3 is an elevation of another embodiment of the invention;

FIG. 4 is a wiring diagram;

Figure 6:
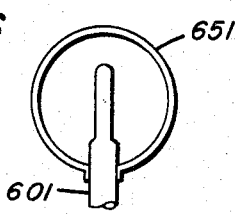
Figure 7:
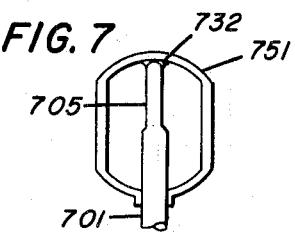
Figure 8:
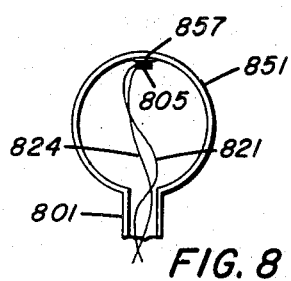
Figure 9:
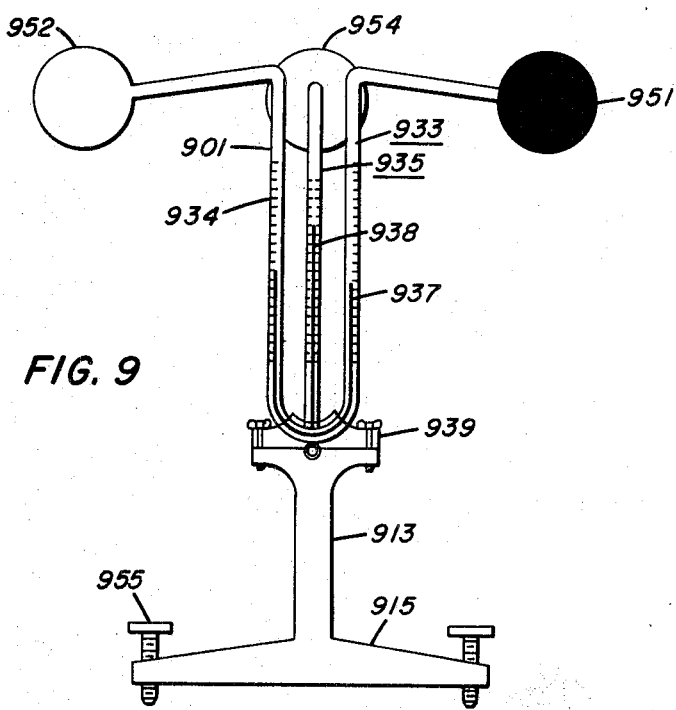
Figure 10:
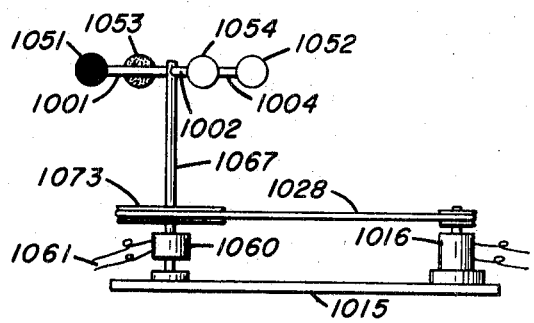
Figure 11:
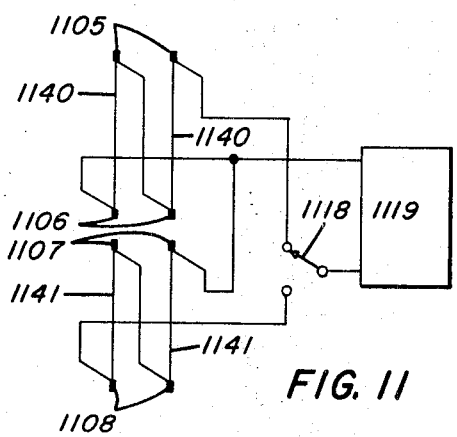
Figure 13:
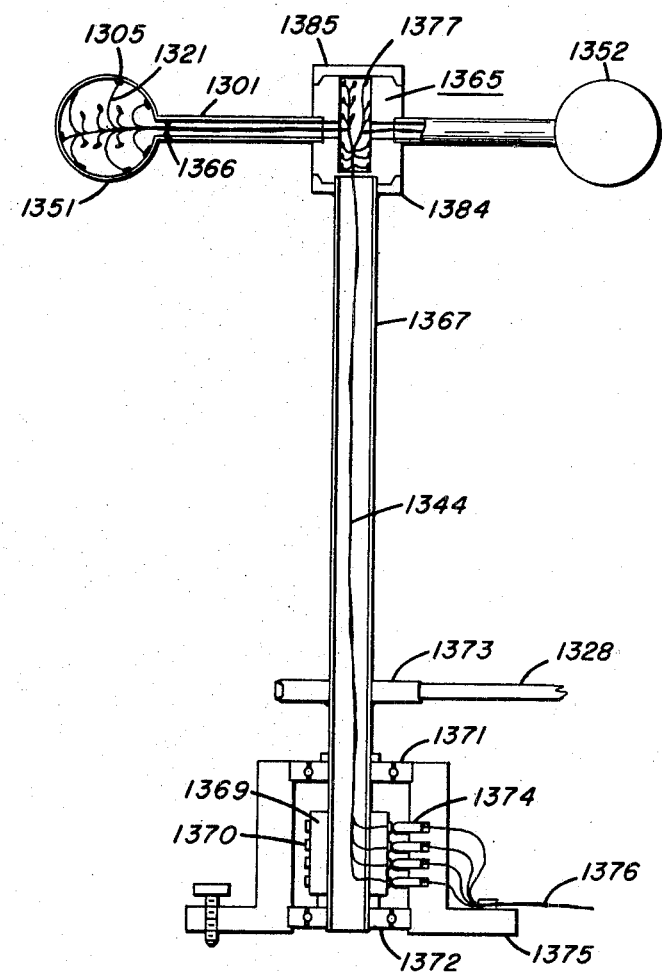
Figure 14:
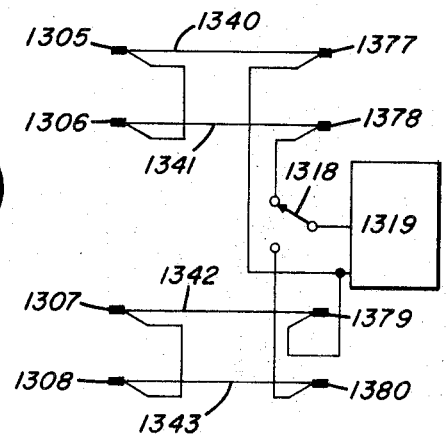
Figure 15:
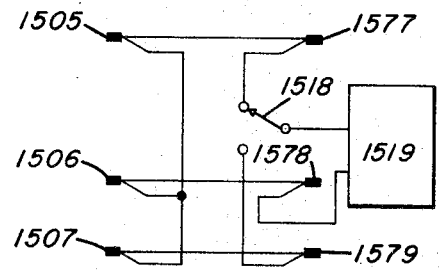

FIGS. 6, 7, and 8 are sections of elements of embodiments of the invention;

FIG. 9 is a vertical partial section of a further embodiment of the invention;

FIG. 10 is an elevation of another embodiment of the invention;

FIG. 11 is a wiring diagram;

FIG. 12 is a horizontal partial section of an element of the invention;

FIG. 13 is a vertical partial section of an embodiment of the invention;

FIGS. 14 and 15 are wiring diagrams;

FIG. 16 is a vertical partial section of another embodiment of this invention;

FIGS. 17 and 18 are wiring diagrams; and

Figure 19:
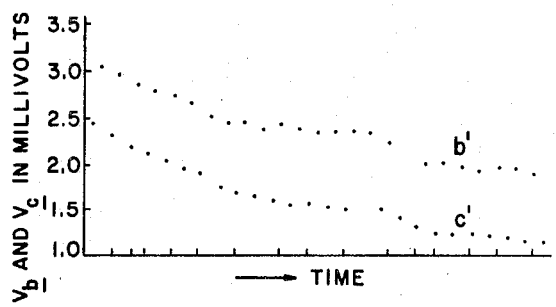
Figure 20:
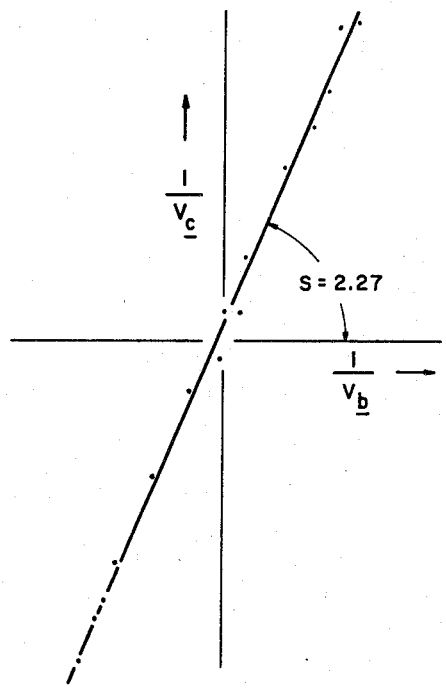
Figure 21:
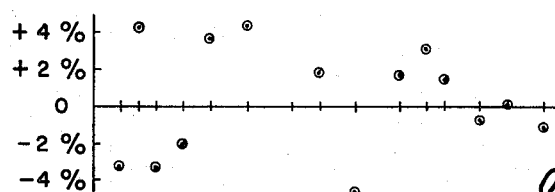

FIGS. 19, 20 and 21 are graphs of results of tests of an embodiment of this invention.

FIG. 1 shows the simplest embodiment, 100, of the invention, three thermometers 101, 102, 103, fixed in a recessed holder 113 and spaced so that equal exposure to the ambient is assured for their sensing bulbs 105, 106, 107. The sensing bulbs have, respectively, surfaces that are characterized by high surface infrared emittance (blackened surface), low surface infrared emittance (polished silver surface), and an intermediate overall infrared surface emittance (a gray coated surface, or optionally a checkered surface, alternately black and polished).

In this disclosure "polished surface" and "bright surface" will be used to mean surface with high surface reflection, no matter whether achieved by polishing, or by silvering, gilding, etc.

"Gray" will mean a surface of emission characteristic intermediate between those of the black and polished surfaces, whether uniformly gray or not. This term is defined more precisely later in the discussion.

As indicated earlier, readings of the thermometer scales 109, 110, 111, during exposure to the environment being measured are interpreted in the light of the discussion following description of the figures.

FIG. 2 shows a fan 220 in use with the embodiment of FIG. 1 to provide equal forced convection at the thermometers.

FIG. 3 is an electrical embodiment of the FIG. 1 version of the invention, 305, 306, and 307 being thermistors with surfaces respectively black, polished, and gray. The black and gray coatings can be painted, the polished coating can be evaporated silver or aluminum over insulating varnish. If, instead of a uniform gray coating, checkering is used, it can be a partially painted silvered or aluminized surface.

The thermistors are supported by leads 321–326 through which the output signals of the sensors are fed to switchbox 318 and, successively to amplifier-display unit 319.

The thermistors are spaced in a manner to assure equal exposure—for example as in FIG. 1.

FIG. 4 is a wiring diagram of the FIG. 3 embodiment. The amplifier-display unit 319 includes the electrical network used generally in the thermistor temperature measurement art to display an electrical signal determinend by the electrical resistance of the units 305, 306, or 307 which indicates temperature on the calibrated scale of unit 319 according to the position of the selector switch 318.

Figure 5:
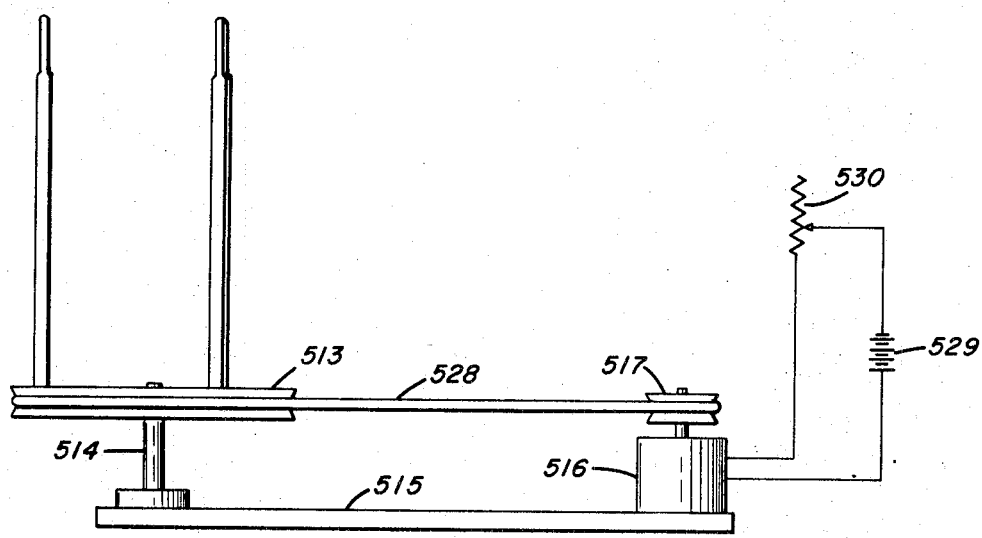
FIG. 5 is an elevation of yet another embodiment of the invention.

FIG. 5 shows an embodiment of this invention in which thermometers are held as in FIG. 1, but with provision for rotation of the holder 513, including a spindle 514, baseplate 515, D.C. motor 516, pulley 517 and belt 528. Battery 529 is placed in series with rheostat 530 to provide motor speed control as required to accomplish another aspect of the invention: according to this aspect of the invention, forced convection at the thermometers is adjusted by varying the rotation rate to a particular value at which errors are minimized, as related in detail in the discussion following description of the figures.

FIG. 6 shows a thermometer 601, provided with a spherical shell or receiver, 651, better adapting the thermometer to receive radiation equally from all directions.

The sphere can be made of thin silver, and friction fitted to the thermometer.

Such spheres can be used with thermometers arranged as in FIG. 1, one sphere being blackened, one polished, and one gray.

FIG. 7 is similar to FIG. 6 except that direct thermal contact is made between the sphere 751 and the sensing bulb 705 of the thermometer 701. Thermal contact can be improved by application of a small quantity of grease 732, or other heat conducting substance, to the contacting surface of the sensing bulb.

The "sphere" is shown here with facets to indicate that receivers of other construction and orientation may be used instead of spheres where the application makes it desirable to have preferential receiving directions.

FIG. 8 shows electrical structure analogous to the version of FIG. 7, and applicable to the FIG. 3 embodiment.

In the FIG. 8 version, one or more (preferably several, uniformly spaced) thermal sensors such as thermistor 805, or a thermocouple, are thermally connected to, and electrically isolated from, the inner surface of the sphere 851 by cement 857. Epoxy cements are satisfactory for this purpose.

Each one of three spheres is supported by a thermally insulating stem 801, such as a thin-walled tube of stainless steel, Invar, or Monel, to which it is soldered. Leads 821 and 824 are connected as in FIG. 3. As in the FIG. 6 embodiment, the outer surfaces of the three spheres are respectively, black, polished, and gray or checkered.

FIG. 9 shows advancement over the FIG. 1 version, in a four sensor embodiment of the invention, the sensors being interconnected in pairs to comprise two opposed differential thermometers 933 and 935, held on stand 913 by transparent vinyl clip 939. The stand has levelling screws 955 in the base 915.

Differential thermometer 933 comprises: glass U-tube 901, which bears calibration markings 934, contains indicator 937, and which supports and interconnects black sphere 951 and polished sphere 952.

Differential thermometer 935 is of similar construction except that the spheres are respectively gray, or checkered (not shown), and polished, shown at 954.

Preferably, the differential thermometers are fashioned of glass, the spheres being thin-wall sensing bulbs containing dry nitrogen or other suitable gas and communicating with each other through the calibrated tubing, separated by a liquid such as mercury, or oil, to indicate the pressure difference.

The tubes are bent in such manner that all four spheres lie in a horizontal plane, and all vertical capillaries have the same length, as shown in FIG. 9.

Variations in the construction are possible—the spheres can be of thin silver, for example, attached to the capillary tubing by glass-to-metal seals.

Further, the differential thermometer bulbs can be covered with radiation receivers as shown in FIG. 6 or FIG. 7.

And, in this differential gas thermometer version of the invention, an enclosed aneroid diaphragm can separate the bulbs so that a conventional pressure-difference readout can substitute for the mercury in the graduated U-tube to indicate differential pressure as a measure of differential temperature.

Alternatively, motion of a liquid slug in a capillary connecting the bulbs can serve to indicate differential volume as a measure of differential temperautre. The FIG. 9 version of the invention is adapted for use with a turntable, like that shown in FIG. 5.

FIG. 10 is a four-sphere electrical embodiment of the invention, analogous to the FIG. 9 embodiment. The spheres 1051, 1052, 1053, and 1054 are disposed at equal angles on equal radii as in FIG. 9, by tubular cross-arms 1001–1004. The tubular cross arms are soldered to vertical axle 1067, which is rotatively mounted to base 1015.

Single or multiple thermocouples or other electrical thermal sensors, as in FIG. 8, are mounted within the spheres of FIG. 10.

Opposed spheres 1051 and 1052 are connected in electrical opposition, and opposed spheres 1053 and 1054 are connected in electrical opposition, to form two differential thermoelectric thermometers, by leads within the tubular cross arms. The pairs of opposed spheres comprise, respectively, a black sphere opposed to a polished sphere, and a gray or checkered sphere opposed to a polished sphere.

The rotational feature of FIG. 5 is shown also in FIG. 10. Slipping assembly 1060 allows the electrical response of the sensors to be fed from the rotating device through cable 1061 to switch box and amplifier-display units. The slipring assembly is described later in connection with the FIG. 13 embodiment.

The rotational feature with the sliprings is equally applicable to the FIG. 3 embodiment.

FIG. 11 is a diagram of the FIG. 10 wiring. The sensors are affixed in the spheres in the manner of sensor 805 in FIG. 8.

In a preferred embodiment, the sensors are copper-constantan thermocouples. Leads 1140 and 1141 are constantan; all other leads in the diagram are copper.

For simplicity, only two thermocouples are shown in each sphere. Thermocouples 1105 in the black sphere are connected in electrical opposition to thermocouples 1106 in a polished sphere and thermocouples 1107 in the gray sphere are connected in electrical opposition to thermocouples 1108 in the other polished sphere.

It is preferable to use many thermocouples in each sphere, attached at points that are uniformly distributed over the inside surface of the sphere. Each thermocouple is connected in series to its oppoosite number in an opposing sphere so that corresponding thermocouples have the same relation to the circuitry as the thermocouples diagramed in FIG. 11. Through this arrangement, the EMF's generated by the many thermocouples attached to the black sphere are in electrical opposition to the EMF's generated by the many thermocouples attached to the opposing polished sphere, and likewise the EMF's generated in the gray sphere are in opposition to the EMF's generated in its opposing polished sphere. The difference in thermoelectric EMF's generated by the opposed, series-connected thermocouples is fed to amplifier display unit 1119. The position of selector switch 1118 determines which pair of spheres is connected for measurement.

FIG. 13 is a partial section through a preferred embodiment of the invention, similar to that of FIG. 10. As in FIG. 10, four spherical receivers are mounted in opposed pairs, black and polished 1351 and 1532, and gray and polished (not shown). The polished spheres are made of .015 in. thick silver, the black sphere of .030 in. thick silver, and the gray sphere of .023 in. thick silver. The response time of the instrument can be shortened by fashioning the spheres of thinner silver, in substantially the same thickness ratios.

Copper constantan thermocouples 1305 made of #40 B&S gauge wire are affixed in thermal contact, but not in electrical contact, to the inner surfaces of the spheres, at points which are uniformly spaced, by means of insulating epoxy cement as in FIG. 8. It is convenient to use 12 or 20 thermocouples per sphere, since these numbers divide a sphere into equal polygons.

In this embodiments of the invention each thermocouple in a sphere is series-connected, by leads 1321, in electrical opposition with a corresponding thermocouple affixed in the same manner in a common reference-block or holder 1365, rather than in an opposing sphere as before. The reference-block is preferably of copper and is of heavy and compact construction to insure that all parts of the block will be at the same temperature.

For convenience in manufacture and in pure-assembly calibration, the reference-block may be comprised of four quandrants having self-holding tapers, which, after test, are clamped together in intimate thermal contact by tapered caps 1384 and 1385.

FIG. 12 shows a horizontal section of the block of FIG. 13 indicating the relation of the quandrants 1386–1389 when the reference block is assembled. The result of this arrangement is that the net EMF in the FIG. 13 embodiment is the same as in the FIG. 10 embodiment since the EMF's generated by one set of thermocouples in the reference block are cancelled by the EMF's from another set at the same temperature in the reference block.

The spheres are mechanically connected to the reference block by thin stainless steel (or other suitable) tubing 1301, soldered at each end. Rubber grommets 1366, in the tubing, retard air circulation into the spheres. The reference block is mounted to tubular axle 1367 by the lower tapered-cap 1384, which is soldered to the axle.

Thermocouple output leads, as cable 1344, pass down tubular axle 1367 and through a hole in it to sliprings 1370 on slipring drum 1369. The tubular axle is mounted rotatably on bearings 1371 and 1372, and driven by a motor (not shown) as in FIG. 10, through belt 1328 and 1319.

Slipring wipers 1374 are mounted in base 1375 which also holds the bearings. Leads 1376 conduct the output signals from the wipers to a switch-box and amplifier-display unit, not shown.

FIG. 14 is a wiring diagram of the four-sphere version of the invention described in FIG. 13.

The thermocouples are preferably of copper-constantan. Leads 1340–1343 are constantan; the other leads are copper. Each thermocouple in the diagram represents plural thermocouples having like relation to the circuitry as previously described, although only one thermocouple is shown at each location, for simplicity. Thermocouple 1305 is affixed in black sphere 1351 of the FIG. 13 embodiment, and thermocouple 1377 is affixed in the copper block 1365. In like manner thermocouple 1306 is affixed in polished sphere 1352, and thermocouple 1378 in the copper block. All thermocouples in contact with the copper block are thus made to be at a common temperature. With switch 1318 in the position shown, the signal differences between the subcircuits of the sphere thermocouples 1305 and 1306 and the respective copper block thermocouples 1377 and 1378 are subtractively compared with each other and the output fed to amplifier-display unit 1319. Similarly, with the switch in the other position, the signals from thermocouples 1307 and 1308 in gray and polished spheres respectively, are compared with their opposite numbers 1379 and 1380 in the copper block, and the net signal difference in these subcircuits is fed as the output signal to the amplifier-display unit 1319.

FIG. 15 is a wiring diagram of an embodiment of the invention similar to that of FIG. 13, but differing in having only three spheres, black, polished, and gray, in which are the sensors 1505, 1506, and 1507. As in the previous diagram, corresponding sensors 1577, 1578, and 1579 are in the copper block at a common temperature. With switch 1518 in the position shown, differences are taken as before within and between the black and polished sphere circuits, and the resultant output signal is fed to the amplifier-display unit. Similarly, with the switch in the other position, the gray and polished sphere circuit signal differences are observed. Each sensor in FIG. 15 preferably represents several having like relation to the circuit as previously described.

FIG. 16 is an elevation in partial section of a two-sphere embodiment of the invention, similar in many details to the FIG. 10 and the FIG. 13 embodiments.

The two spheres 1651 and 1653 are black, and gray or checkered, respectively, and contain thermocouples as in the FIG. 10 and the FIG. 13 versions. The thermocouples 1677, 1679, corresponding in function to those mounted in the FIG. 10 polished spheres, are cantilevered in mid-air in tubular axle 1667, to yield EMF's representative of the air temperature.

The top of the tubular axle is open for free passage of air, but closed to radiation by polished silver shield 1645, which is held in place by spring clips 1646. The tubular axle is closed at the bottom by a plug 1697, and contains a vent 1698, through which air may be drawn by a pump connected to the base at 1699 to ventilate the cantilevered junctions. Bearings 1671 and 1672 are of the sealed type.

It is important to allow enough length of lead at the cantilevered ends of the leads to be exposed to the airstream to insure that the airstream dominates in determining the temperatures of the thermo junctions at the tips.

The cantilevered or "air" thermocouple junctions should be made with about the same thermal relaxation time-constant as those connected thermally to the spheres, by control of the mass of the junctions, as, for example, by added solder.

FIG. 17 shows the wiring interconnection for the FIG. 16 embodiment of the invention. Leads 1640 and 1642 are constantan. The other leads are copper. Thermocouple 1605 in the black sphere is connected in opposition to thermocouple 1677 located in the airstream under the radiation shield 1646; in like manner thermocouple 1607 ing the gray sphere is connected to thermocouple 1679. As before, it is preferable that plural junctions be used at each location.

FIG. 18 shows the wiring interconnection of an embodiment which also uses the mechanical arrangement of FIG. 16. In this embodiment a sensor 1881 located in the airstream under the radiation shield 1646 may be connected in circuit with a sensor 1805 in the black sphere, or alternatively with a sensor 1807 in the gray sphere, through switch 1818.

If the sensors used in this embodiment are thremocouples, leads 1840 and 1842 may be constantan and the other leads copper.

DISCUSSION

The instrument of this invention is designed to measure the difference between the mean radiation temperature of the surround, $t_R$, and the air temperature, $t_A$. We call this difference the mean radiation temperature increment. We represent this difference hereunder by the symbol $\theta$.

Unlike the response of certain other instruments which have been devised to measure $\theta$, the radiation response of this thermally passive instrument is independent of air movement so long as air convection is the same for all its sensing assemblies. A chief purpose of the creation of relative air movement, as described in connection with FIGS. 2, 5, 9, 10, 13, and 16, is to equalize air convection about the sensor assemblies. Taking the preferred embodiment of FIG. 13 as an example for discussion, the response of the instrument consists of EMF readings. One reading, $V_B$, indicates the incremental temperature rise of the thermal junctions in the black sphere above the temperature of the thermal junctions in the polished sphere. The other EMF reading, $V_C$, indicates the incremental temperature rise of the thermal junctions in the gray sphere above the temperature of the corresponding polished sphere thermal junctions.

By gray sphere, we mean a sphere of total hemispherical emissivity $\Psi=\frac{1}{2}$, although it can vary widely from this value, say from $\Psi=\frac{1}{4}$ to $\Psi=\frac{3}{4}$.

The opposed junctions of each sphere are clamped in thermal contact with the central copper block, although electrically insulated from it by thin mica sheet. The EMF's generated by the thermal junction here are in matching opposed pairs so that either EMF's $V_B$ or $V_C$, above, is independent of the temperature of the junctions in the copper block, which are all at the same block temperature.

If $V_B$ and $V_C$ represent EMF's produced by the incremental temperature rise of the black and gray spheres respectively, the mean radiation temperature increment expressed as an EMF, $V_B$ is:

$$\frac{S-1}{V_\theta}=\frac{S}{V_B}-\frac{1}{V_C}$$

If $t_A$ is the air temperature as represented by the temperature of the polished sphere, if $t_B$ is the temperature of the black sphere, and if $t_C$ is the temperature of the gray or checkered sphere, then, by definition, the temperature difference corresponding to $V_B$ is $b=t_B-t_A$, and similarly the temperature difference corresponding to $V_C$ is $c=t_C-t_A$. The constant S is determined in a manner described later.

The same principle applies to all embodiments of the invention, the necessary changes having been made. From the thermistor resistances of the FIG. 3 embodiment, for example, we get $t_A$, $t_B$, $t_C$ which give the differences:

$$b=t_B-t_A$$
$$c=t_C-t_A$$

which values of $(b, c)$ go into Equation 3b (below) to give the temperature difference represented by $$V_0, \quad \theta=(t_R-t_A)$$

The various circuits using thermocouples, give voltage differences which are proportional to $(b, c)$ directly without temperature subtractions, and these $(b, c)$ values can go directly into Equation 3b (below).

It is obvious that by invoking analog, or real time, computer techniques which are now well known in the art, the thermal sensor outputs of embodiments of this invention can be processed to yield $\theta$ directly.

Let us suppose that the total hemispherical emissivities of the black and gray spherical bulbs are $\beta$ and $\Psi$. ($\beta$ for the black bulb was measured as 0.93). These are total emissivities for heat loss by operating temperature radiations. The absorptivities for the incident surround temperature radiation are, accordingly, also $\beta$ and $\Psi$ if the character of radiation from the surround is not substantially different from the character of the radiation characteristic of black body emission at the operating temperatures. The character of the incident radiation may be different in quality, as for example sunlight, which has a spectrum peaked near a wave-length of ½ micron and has very little radiation beyond a wave-length of 3 microns, whereas the spectrum of the emitted radiation of the spheres at say 300° K. or 27° C. will be peaked near a wave-length of 10 microns. In such case the absorption coefficients will only be equal, respectively, to the emissivities of the spheres, $\beta$ and $\Psi$, if the sphere coverings are gray; that is, if the spectral emissivities are the same at ½ micron and 10 microns as well as at all other wavelengths. In the following derivations it is assumed that the spectral emissivities of the sphere coverings are thus the same at all wavelengths.

If the mean radiation temperature of the surround is $t_A+\theta$, then the absolute temperatures of the surround; of the air; and of the spheres, are, respectively, $T_A+\theta$; $T_A$; $T_A+b$; and $T_A+c$.

Invoking Stefan's fourth power radiation law and equating total heat loss to heat gain, for each sphere, and cancelling out sphere areas, we get, for the steady state.

$$\beta\sigma(T_A+\theta)^4-\beta\sigma(T_A+b)^4=N(t_B-t_A) \quad \text{Eq. 1}a$$
$$\Psi\sigma(T_A+\theta)^4-\Psi\sigma(T_A+c)^4=N(t_C-t_A) \quad \text{Eq. 2}a$$

In these equation $\sigma$ is Stefan's total radiation constant. Here N is the cooling coefficient for cooling by air conduction and convection, according to Newton's cooling law. Thus $N(t_B-t_A)$ is the air cooling rate of the black sphere and $N(t_C-t_A)$ is that of the gray or checkered sphere.

Expanding the expressions in parentheses that contain $T_A$, and dropping terms with $b$, $c$, and $\theta$ of an order higher than first; dividing both equations by $4\sigma T_A^3$, and setting $n=N/4\sigma T_A$, we get:

$$\beta b+nb=\beta\theta$$
$$\Psi c+nc=\Psi\theta$$

In these equations $b$ and $c$ are the temperature differences that produce the measured voltages. Eliminating $n$ from the two equations yields a single equation defining $\theta$. In this equation $\theta$ is determined independent of air circulation.

$$\frac{\beta-\Psi}{\theta}=\frac{\beta}{b}-\frac{\Psi}{c} \quad \text{Eq. 3}a$$

Or setting S equal to the ratio of emissivities, $\beta/\Psi$, we get:

$$\frac{S-1}{\theta}=\frac{S}{b}-\frac{1}{c} \quad \text{Eq. 3}b$$

We may use $V_0$, $V_B$, and $V_C$ for $\theta$, $b$, and $c$ respectively, Equation 3a or 3b, since each EMF is proportional to the corresponding temperature difference with the same proportionality constant.

Still referring to the preferred embodiment of FIG. 13, the sphere walls should be thick enough so that circumferential thermal conduction will be adequate to make the spheres nearly isothermal. Ideally, the gray or checkered sphere wall should have a smaller heat capacity than the black to make its relaxation time constant substantially the same as that of the black sphere. Also, the polished sphere wall should have an even smaller heat capacity, so that its relaxation time constant is the same as the other two. Then the significance of the voltage readings that give $b$ and $c$ will be substantially independent of transient variations in air cooling. This equality of time constants is realized by making the wall thickness of the spheres different, as set forth above in connection with the description of FIG. 13, to correspond to the different heat losses by radiation, due to the different values of $\beta$ and $\Psi$.

An embodiment of the invention similar to that of FIG. 13 was tested to prove the independence of $\theta$ values from ventilation. It was exposed to a constant irradiation; FIG. 19 gives the produced EMF's, $V_B$ and $V_C$, as function of time.

During these observations the rate of forced ventilation (achieved by an increasing rate of rotary motion) was gradually increased until convection cooling had reduced $V_B$ and $V_C$ to approximately one-half of the original values. Since the irradiation was a constant, we can use the data of FIG. 19 to solve for S. The reciprocal of $V_B$ is plotted as abscissae, against ($1/V_C$) as ordinates. FIG. 20 shows this plot for corresponding points in FIG. 19. The slope of the straight line that best represents the plotted points is 2.27. This is the quantity S of Equation 3$b$. Knowing S we can use Equation 3$b$ to calculate the radiation temperature increment, $V_\theta$. FIG. 21 is a plot of the calculated $\theta$'s for the various sets of $V_B$ and $V_C$ values from FIG. 19, showing the substantial ventilation independence of the $\theta$ determinations.

The FIG. 13 embodiment and similar versions of the instrument can be calibrated by exposure to a constant irradiation $\theta$ at only two ventilation rates, yielding two sets of $V_B$ and $V_C$ EMF readings. One of the two sets of $V_B$ and $V_C$ EMF readings is made with slow rotation, and the other set is made with fast rotation. The constant S thus determined will be:

$$S = \frac{\frac{1}{c_1} - \frac{1}{c_2}}{\frac{1}{b_1} - \frac{1}{b_2}}$$

The value of the constant irradiation, $\theta$, can be determined from these two sets of readings with the derived value for the constant S.

For an instrument using six junctions of copper and constantan wires, a factor of 0.24 mv./° C. converts $V_\theta$ to the radiation temperature increment—the temperature rise above air temperature that the black sphere would have assumed if air conduction had been absent.

If the polished sphere is not at air temperature, but differs from it by an amount $dt_A$, then this error will be negligible when the rotation rate is such that the term $$\left(\frac{S}{b^2} - \frac{1}{c^2}\right)$$

vanishes. This term crosses over from positive to negative as the ventilation increases. For the FIG. 19 data, the crossover occured at $$\frac{b}{c} = \sqrt{S} = 1.50$$

in the middle of the range covered.

This meter, in a configuration suitable for ascension with a ballon to the stratosphere, can be used to determine the black-sphere temperature in the earth's atmosphere as a function of altitude. This black-sphere temperature is an important meteorological parameter now being measured by physical meteorologists.

Obviously many modifications of the present invention are possible in the light of the above teachings. For example, various other thermal detectors known in the art may be substituted for those indicated, as the application may warrant. Aagain, although the various embodiments are adapted to use with forced ventilation, the meter will function with natural ventilation. Further, the polished sensor may be subjected to selective forced ventilation as by proper direction of the fan in the FIG. 2 embodiment, or by appropriate selection of the pumping rate with respect to the rotation rate in the FIG. 16 embodiment. It is, therefore, to be understood that the invention may be practiced otherwise than as specifically described.

What is claimed is:

1. A mean radiation temperature meter comprising at least three radiation receiving elements having radiation receiving surfaces, dissimilar surface treatment on each said surface for producing a discrete thermal emissivity characteristic in each said radiation receiving element, the mass of each radiation receiving element differed from the mass of the other radiation receiving elements in an amount proportional to the respective surface emissivity characteristics thereof for producing equal thermal relaxation time constants among all said radiation receiving elements, and means to measure the temperature of each radiation receiving element.

2. A mean radiation temperature meter as described in claim 1, said elements having wall means with thicknesses thereof respectively differed for adaption of all said radiation receiving elements to have equal thermal relaxation time constants.

3. A mean radiation temperature meter as described in claim 1, and means adapted to move plural of said radiation receiving elements in unison, thereby producing equal exposure of said moved elements during mean radiation temperature measurement.

4. A mean radiation temperature meter for use in an ambient fluid, comprising: three thermal sensors having electrical outputs and radiation receiving surfaces, one said sensor having a high-emission receiving surface, one said sensor having a low-emission receiving surface, one said sensor having an intermediate-emission receiving surface, thermally passive means to observe the output of all said sensors consisting of an EMF measurer and leads connecting all said sensors thereto, a holder to position all said sensors in spaced relation, and motor means for producing equal flow of said ambient fluid past the respective thermal sensors.

5. A mean radiation temperature meter for use in an ambient fluid comprising: plural thermal sensors having radiation receiving surfaces, one said sensor having a high-emission receiving surface, one said sensor having a low-emission receiving surface, one said sensor having an intermediate emission surface, means to observe the output of all said sensors, a holder to position all said sensors in spaced relation, and motor means to produce equal flow of said ambient fluid past all said thermal sensors.

6. A mean radiation temperature meter for use in an ambient fluid comprising: plural thermal sensors having radiation receiving surfaces, one said sensor having a high-emission receiving surface, one said sensor having a low-emission receiving surface, one said sensor having an intermediate-emission surface, means to observe the output of all said sensors, a holder to position all said sensors in spaced relation, and motor means to produce equal flow of said ambient fluid past all said thermal sensors, said motor means being adapted to rotate said holder.

7. A mean radiation temperature meter for use in an ambient fluid comprising: plural thermal sensors having radiation receiving surfaces, one said sensor having a high-emission receiving surface, one said sensor having a low-emission receiving surface, one said sensor having an intermediate emission surface, means to observe the output of all said sensors, a holder to position all said sensors in spaced relation, and motor means to produce equal flow of said ambient fluid past said sensor having a high-emission receiving surface and said sensor having an intermediate-emission receiving surface.

8. A mean radiation temperature meter comprising: three thermometers having thermal sensing bulbs, one said thermometer thermal sensing bulb having a black area, one said thermometer thermal sensing bulb having a gray area, one said thermometer sensing bulb having a bright area, each said thermometer having a graduated transparent stem and a fluid slug in the stem for indicating the thermal sensing thereof, and a holder to position all said thermometers in spaced relation.

9. A mean radiation temperature meter comprising: three thermometers having thermal sensing regions, one said thermometer thermal sensing bulb having a black area, one said thermometer thermal sensing region having a gray area, one said thermometer thermal sensing region having a bright area, a holder to position all said thermometers in spaced relation, and motor means to move that portion of said holder supporting the thermometers whereby all said sensing regions have equal exposure for thermal interchange with the ambient environment.

10. A mean radiation temperature meter for use in an ambient fluid, comprising: thermally passive structure, including plural radiation receivers electrically responsive to radiation, at least one said receiver being black, at least one said receiver being gray, at least one said receiver being bright, EMF measuring means to observe the radiation received by the receivers, a holder to position all said receivers in spaced relation, and means for producing an equal flow of said ambient fluid past said receivers.

11. A mean radiation meter comprising: plural thermal sensors, plural radiation receivers, at least one said receiver being black, at least one said receiver being gray, at least one said receiver being bright, a part of each said thermal sensor being within a respective radiation receiver, means to observe the output of all said sensors, a holder to position all said sensors and receivers in spaced relation, and motor means adapted to move the portion of said holder containing said receivers.

12. A mean radiation temperature meter consisting of: three thermometers having respective sensing areas, three thermally conductive receivers, a portion of each thermometer sensing area affixed within a respective receiver, one said receiver having a black area, another said receiver having a gray area, the third said receiver having a bright area, means to observe the thermal responses of the thermometers consisting of a graduated transparent stem on each thermometer and fluid bodies in all said stems, and a holder to position all said elements in spaced relation.

13. A mean radiation temperature meter comprising: three thermometers, three thermally conductive receivers, a portion of each thermometer affixed within a respective receiver, one said receiver having a black area, another said receiver having a gray area, yet another said receiver having a bright area, means to observe the thermal responses of the thermometers, a holder to position all said receivers in spaced relation, the said holder including motor means to move that part of the holder containing the thermometers.

14. A mean radiation temperature meter comprising: a first differential thermometer including a first pair of thermometer bulbs, a black receiving area on one bulb, a bright receiving area on the other bulb, a response interconnection including transparent tubing between the bulbs of the first pair; a second differential thermometer including a second pair of thermometer bulbs, a bright receiving area on one bulb of the second pair, a gray receiving area on the other bulb of the second pair, a response interconnection including transparent tubing between the bulbs of the second pair; means including markings, and fluid in the respective said tubing for subtractively comparing the said responses of all said pairs of bulbs, and a holder to position all said bulbs in spaced relation.

15. A mean radiation temperature meter comprising: a first pair of thermally responsive sensors, a black receiving area on one sensor, a bright receiving area on the other sensor, a response interconnection between the sensors of the first pair; a second pair of thermally responsive sensors, a bright receiver area on one sensor of the second pair, a gray receiving area on the other sensor of the second pair, a response interconnection between the sensors of the second pair; means for subtractively comparing the said responses of all said pairs of sensors, a holder to position all said sensors in spaced relation, and motor means to move a part of the holder whereby all said receiving areas have equal exposure for thermal interchange with the ambient environment.

16. A mean radiation temperature meter for use in an ambient fluid, comprising: thermally passive structure including plural spaced receivers, one of said receivers having a gray area, a second one of said receivers having a black area, and a third one of said receivers having a bright area, plural pairs of electrically responsive sensors, one sensor of each pair being in thermal contact with a respective receiver, the leads connectnig the respecitve sensors of each said pair, measuring means to observe the response of all said pairs of sensors, and motor means for producing equal flow of said ambient fluid past said receiver having a gray area and said receiver having black area.

17. A mean radiation temperature meter comprising: plural receivers, one of said receivers having a gray area, one of said receivers having a black area, one of said receivers having a bright area, a holder having a substantial thermal mass, arms connecting the receivers with the holder, plural pairs of electrically responsive sensors, one sensor of each pair being in thermal contact with a respective receiver, the other sensor of each pair being in thermal contact with said holder, leads connecting the respective sensors of each said pair, electric display means to observe the response of all said pairs of sensors, a part of said holder being rotatable and containing at least said receiver having a gray area and said receiver having a black area, and motor means to rotate rotatable part of said holder, whereby said receivers on said rotatable part of the holder have equal exposure for thermal interchange with ambient environment.

18. A mean radiation temperature meter for use in an ambient fluid comprising: plural receivers, a first said receiver having a black area, a second said receiver having a gray area; a radiation shield; plural sensors; a first said sensor in thermal contact with said first receiver, a second said sensor in thermal contact with said second receiver, a third said sensor in adjacent spaced relation to said radiation shield; a responsive electric signal measuring circuit for selective connection of said sensors; means including a motor to force ambient fluid selectively past said third sensor and radiation shield and motor means to produce equal flow of ambient fluid on the first said and second said receivers.

19. A mean radiation temperature meter for use in an ambient fluid comprising: four thermally passive receivers, one of said receivers having a bright area, a second one of said receivers having a bright area, one of said receivers having a black area, one of said receivers having a gray area; a central holder having a substantial thermal mass, arms connecting the receivers with the holder; four pairs of electrically responsive sensors; one sensor of each pair being in thermal contact with a respective receiver, the other sensor of each said pair being predominately in thermal contact with said central holder; electric leads connecting the respective sensors of each said pair, thermally passive means including a measurer responsive to EMF to observe the response of all said pairs of sensors, and motor means to produce an equal flow of said ambient fluid past all said receivers.

20. A mean radiation temperature meter comprising: four receivers, one of said receivers having a bright area, a second of said receivers having a bright area, one of said receivers having a black area, one of said receivers having a gray area; a central holder having a substantial thermal mass; arms connecting the receivers with the holder; four pairs of electrically responsive sensors; one sensor of each pair being in thermal contact with a respective receiver, the other sensor of each pair being in contact with said central holder; electric leads connecting the respective sensors of each said pair; electric display means to observe the response of all said pairs of sensors; part of said holder being rotatable and containing all said receivers and motor means to rotate said part of said holder, whereby all said receivers have equal exposure for thermal interchange with the ambient environment.

21. The method of determining the mean radiation temperature of an environment using a meter comprising plural thermally responsive sensors including a black sensor, a gray sensor, and a bright sensor, and adjustable speed motor means adapted to create adjustable relative motion between the sensors and a part of the environment, comprising the steps of:
(a) calibrating the meter by:
 (1) Exposing the meter in an environment having a substantially constant mean radiation temperature increment;
 (2) Energizing the motor means at a rate of speed, thereby establishing a relative motion of the said sensors with respect to a part of the environment;
 (3) Noting the incremental temperature response $b_1$ of the black sensor as compared with the bright sensor, and the incremental temperature response $c_1$ of the gray sensors as compared with the bright sensor;
 (4) Energizing the motor means at a different rate of speed;
 (5) Noting the incremental temperature response $b_2$ of the black sensor as compared with the bright sensor, and the incremental temperature response $c_2$ of the gray sensor as compared with the bright sensor;
 (6) Calculating the constant S by the relation:

$$S = \frac{\frac{1}{c_1} - \frac{1}{c_2}}{\frac{1}{b_1} - \frac{1}{b_2}}$$

(b) exposing the meter to the environment in which the mean radiation temperature increment, $\theta$, is to be measured;
(c) Noting the incremental response $b$ of the black sensor as compared with the bright sensor and the incremental response $c$ of the gray sensor as compared with the bright sensor;
(d) Determining the environmental mean radiation temperature increment $\theta$ by substituting the values for S, $b$, and $c$ in the following equation:

$$\theta = \frac{S-1}{\frac{S}{b} - \frac{1}{c}}$$

22. The method of determining the mean radiation temperature of an environment using a meter comprising plural thermally responsive sensors including a black sensor, a gray sensor, and a bright sensor, and adjustable speed motor means adapted to create adjustable relative motion between the sensors and a part of the environment, comprising the steps of:
(a) Calibrating the meter by:
 (1) Exposing the meter in an environment having a substantially constant mean radiation temperature increment;
 (2) Energizing the motor means at a rate of speed, thereby establishing a relative motion of the said sensors with respect to a part of the environment;
 (3) Noting the incremental temperature response $b_1$ of the black sensor as compared with the bright sensor, and the incremental temperature response $c_1$ of the gray sensors as compared with the bright sensor;
 (4) Energizing the motor means at a different rate of speed;
 (5) Noting the incremental temperature response $b_2$ of the black sensor as compared with the bright sensor, and the incremental temperature response $c_2$ of the gray sensor as compared with the bright sensor;
 (6) Calculating the constant S by the relation:

$$S = \frac{\frac{1}{c_1} - \frac{1}{c_2}}{\frac{1}{b_1} - \frac{1}{b_2}}$$

(b) Adjusting the meter by setting the motor speed to a value that gives $c_3$ and $b_3$ such that:

$$\frac{S}{b^2_3} - \frac{1}{c^2_3} = 0$$

(c) Exposing the meter to the environment in which the mean radiation temperature increment, $\theta$, is to be measured, with the motor energized at the said set speed;
(d) Noting the incremental response $b$ of the black sensor as compared with the bright sensor and the incremental response $c$ of the gray sensor as compared with the bright sensor;
(e) Determining the environmental mean radiation temperature increment $\theta$ by substituting the values for S, $b$, and $c$ in the following equation:

$$\theta = \frac{S-1}{\frac{S}{b} - \frac{1}{c}}$$

23. The method of determining sensor response to the mean radiation temperature in a fluid environment using a meter comprising plural thermally responsive sensors including a black sensor, a gray sensor, and a bright sensor, and motor means adapted to create equal flow of said fluid over the sensors, comprising the steps of:
(A) exposing the meter in said environment;
(B) energizing the motor and establishing an equal flow of said fluid over the sensors;
(C) comparing the incremental temperature response of the black sensor as compared with the bright sensor, and the incremental temperature response of the gray sensor as compared with the bright sensor; thereby determining said sensor response to the mean radiation temperature in the fluid environment.

24. The method of obtaining sensor responses to the mean radiation temperature in a fluid environment, comprising the steps of:
(A) exposing black, gray, and bright radiation sensors in the fluid environment in which the mean radiation temperature is to be measured;
(B) producing equal flow of the environmental fluid past the respective black and gray sensors at a fixed rate; and
(C) obtaining the incremental responses of the respective sensors under the condition of equal flow of environmental fluid at said rate; thereby obtaining said sensor responses to the mean radiation temperature in said fluid environment.

25. The method of determining sensor responses, in a fluid environment, of a mean environmental temperature radiation meter comprising plural thermally responsive sensors having respectively different emissivity characteristics, comprising the steps:
(A) exposing the meter to an environment to be measured;

(B) creating equal flow of the environmental fluid over said sensors; and
(C) measuring the responses of said sensors under said equal flow, thereby determining the sensor responses of said mean environmental temperature radiation meter in said fluid environment.

References Cited

UNITED STATES PATENTS

| | | | |
|---|---|---|---|
| 2,186,948 | 1/1940 | Alder | 73—355 |
| 2,685,795 | 8/1954 | Hardy et al. | 73—355 XR |

OTHER REFERENCES

Richards, C. H. et al., The Panradiometer, etc. In Review of Scientific Instruments, vol. 22, No. 12, December 1951, pp. 925–934 ( pp. 925, 932, and 933 only supplied).

LOUIS R. PRINCE, Primary Examiner

F. SHOON, Assistant Examiner

U.S. Cl. X.R.

73—170, 340